(12) United States Patent
Zeng et al.

(10) Patent No.: US 11,619,599 B2
(45) Date of Patent: Apr. 4, 2023

(54) SUBSTANCE IDENTIFICATION DEVICE AND METHOD FOR EXTRACTING STATISTICAL FEATURE BASED ON CLUSTER ANALYSIS

(71) Applicants: Tsinghua University, Beijing (CN); NUCTECH COMPANY LIMITED, Beijing (CN)

(72) Inventors: Zhi Zeng, Beijing (CN); Xingyu Pan, Beijing (CN); Xuewu Wang, Beijing (CN); Junli Li, Beijing (CN); Ming Zeng, Beijing (CN); Jianmin Li, Beijing (CN); Ziran Zhao, Beijing (CN); Jianping Cheng, Beijing (CN); Hao Ma, Beijing (CN); Hui Zhang, Beijing (CN); Hao Yu, Beijing (CN); Bicheng Liu, Beijing (CN)

(73) Assignees: Tsinghua University, Beijing (CN); Nuctech Company Limited, Beijing (CN)

( * ) Notice: Subject to any disclaimer, the term of this patent is extended or adjusted under 35 U.S.C. 154(b) by 294 days.

(21) Appl. No.: 16/935,415

(22) Filed: Jul. 22, 2020

(65) Prior Publication Data
US 2021/0025836 A1    Jan. 28, 2021

(30) Foreign Application Priority Data
Jul. 23, 2019   (CN) .......................... 201910669208.5

(51) Int. Cl.
*G01N 23/201*   (2018.01)
*G01N 23/02*    (2006.01)
*G06K 9/62*     (2022.01)

(52) U.S. Cl.
CPC .......... *G01N 23/201* (2013.01); *G01N 23/02* (2013.01); *G06K 9/6226* (2013.01);
(Continued)

(58) Field of Classification Search
CPC ...... G01N 23/201; G01N 23/02; G01N 23/20; G01N 2223/501; G01N 2223/304;
(Continued)

(56) References Cited

U.S. PATENT DOCUMENTS 9,841,530 B2 *  12/2017  Blanpied .............. G01V 5/0091

OTHER PUBLICATIONS

Extended European Search Report for European Patent Application No. 20187211.6 dated Feb. 19, 2021, 8 pages.
(Continued)

*Primary Examiner* — Jurie Yun
(74) *Attorney, Agent, or Firm* — Merchant & Gould P.C.

(57) ABSTRACT

The present disclosure provides a substance identification device and a substance identification method. The substance identification device comprises: a classifier establishing unit configured to establish a classifier based on scattering density values reconstructed for a plurality of known sample materials, wherein the classifier comprises a plurality of feature regions corresponding to a plurality of characteristic parameters for the plurality of known sample materials, respectively; and an identification unit for a material to be tested, configured to match the characteristic parameter of the material to be tested with the classifier, and to identify a type of the material to be tested by obtaining a feature region corresponding to the characteristic parameter of the material to be tested.

12 Claims, 7 Drawing Sheets

(52) U.S. Cl.
CPC ..... *G06K 9/6277* (2013.01); *G01N 2223/052* (2013.01); *G01N 2223/054* (2013.01); *G01N 2223/304* (2013.01); *G01N 2223/501* (2013.01)

(58) Field of Classification Search
CPC ....... G01N 2223/052; G01N 2223/054; G01N 2223/205; G01N 2223/601; G06K 9/62; G06K 9/6277; G06K 9/6226; G06K 9/00523; G06K 9/00536; G06K 9/6218; G01V 5/0025
See application file for complete search history.

(56) References Cited

OTHER PUBLICATIONS

Blanpied, G. et al., "Material discrimination using scattering and stopping of cosmic ray muons and electrons: Differentiating heavier from lighter metals as well as low-atomic weight materials", Nuclear Instruments & Methods in Physics Research, 784: 352-358 (Jun. 2015).

Stylianos, C., "Purdue e-Pubs Open Access Dissertations Theses and Dissertations Cosmic ray muons for spent nuclear fuel monitoring", XP055774672, 21 pages (Jan. 2016); Retrieved from the Internet: https://docs.lib.purdue.edu/cgi/viewcontent.cgi?article=1736&content=open_access_dissertations.

* cited by examiner

SUBSTANCE IDENTIFICATION DEVICE AND METHOD FOR EXTRACTING STATISTICAL FEATURE BASED ON CLUSTER ANALYSIS

CROSS-REFERENCE TO RELATED APPLICATION(S)

This application claims a priority to Chinese Application No. 201910669208.5 filed on Jul. 23, 2019, the contents of which are incorporated herein by reference in their entirety.

TECHNICAL FIELD

The present disclosure relates to radiation detection and safety inspection methods, and is directed to identify different types of materials with natural cosmic rays having a strong penetrating capability. More specifically, the present disclosure relates to a device that uses cosmic rays to identify substances quickly, and a corresponding method for identifying substances quickly.

BACKGROUND

Cosmic rays are high-energy radiations from outer space. When it reaches the earth's atmosphere, it may generate a plurality of secondary particles, some of which can reach the earth's surface. At the earth's surface, Muon is a charged particle with the highest flux in the cosmic rays, wherein its flux is approximately 1 cm$^{-2}$ min$^{-1}$. In the cosmic rays, Muon has a certain energy distribution and angular distribution, wherein it may have an average energy of about 4GeV, and a zenith angle θ conforming to the relationship of cos$^2$θ approximately.

When the muon passes through a certain object, the muon will interact with the material it passes through, leading to an energy loss or a direction deflection. Based on these two different forms, the transmission imaging and scattering imaging technologies of cosmic ray muon are gradually developed. Muon scattering technology has the advantages of strong penetrating capability and introducing no additional radiation sources. Therefore, this technology is gradually introduced into the field of safety inspection as a new radiation imaging technology for imaging and identification of substances.

When the muon passes through a certain medium, it will be deflected at a small angle by multiple times. The deflection is mostly caused by the Coulomb scattering between the muon and the nuclei of the medium. The plane scattering angle θ of Muon passing through the material is approximately subject to the Gaussian distribution, wherein the mean value of the distribution is 0, and the standard deviation can be approximately given by the Rossi formula:

$$\sigma_\theta \approx \frac{15\text{MeV}}{\beta cp} \cdot \sqrt{\frac{x}{X_0/\rho}} \quad (1)$$

wherein p is the momentum of the incident muon, and βc is the speed of the muon. With respect to the muon of GeV magnitude, βcp is approximately equal to the energy E of the muon; x is the thickness of the medium along the direction of incidence of the muon with the common unit of cm; ρ is the density of the medium with the common unit of g/cm$^3$; $X_0$ is the radiation length of the medium with the common unit of g/cm$^2$. In addition, $X_0/\rho$ can also be used as the expression of the radiation length of the medium with the common unit of cm. The radiation length is a physical quantity that describes the properties of the medium, and can be used to represent the average thickness of the medium that the high-energy particles pass through when its energy is lost to 1/e of the initial energy due to the toughening radiation. The radiation length is related to the atomic number and the mass number of the medium. In general, the higher the atomic number, the smaller the radiation length. In the muon scattering imaging process, the scattering density λ is usually used to describe the material properties:

$$\lambda = \left(\frac{15\text{MeV}}{E}\right)^2 \frac{1}{X_0/\rho} \approx \frac{\sigma_\theta^2}{x} \quad (2)$$

The scattering density is normally in a unit of mrad$^2$/cm, which reflects the reciprocal of the radiation length of the material. In addition, according to the Rossi formula, it essentially describes the variance of the scattering angle when the muon with a certain energy pass through the certain thickness of the material. In the measurement, the information on the scattering density of the measured object can be obtained by measuring the scattering angle distribution of the muon passing through the medium, so as to estimate the radiation length of the measured object.

Figure 1:
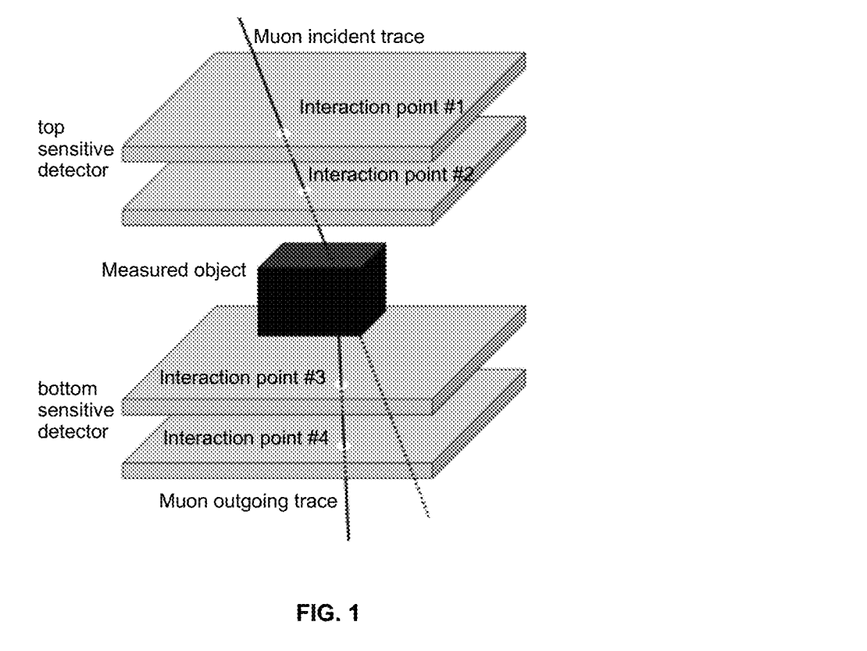
FIG. 1 shows a typical track array detection system.

In order to measure the angular deflection of the muon when passing through the object to be measured, a track array detection system is usually used. The typical track array detection system is shown in FIG. 1. Usually, multi-layer sensitive detectors are placed on the top and bottom of the area to be measured. When the cosmic ray muon incidents, it interacts with the detector. The detector records the spatial position of the interact point. The incident and outgoing traces are reconstructed according to the spatial positions. Once the incident and outgoing tracks are reconstructed, the deflection angle of the muon passing through the measured object is obtained.

In order to realize the estimation of the scattering density of the material at different positions of the measured area, the muon scattering imaging algorithm can generally be used to reconstruct the material scattering density values of different three-dimensional voxels in the measured area. Typical reconstruction methods comprise PoCA, MLSD and other different algorithms.

Cosmic rays will have a large deflection in the heavy atomic number materials (such as lead, uranium, etc.), and the heavy atomic number materials can be identified based on the reconstructed material scattering density values. However, when the cosmic rays pass through the small atomic number materials (such as water, plastic, flour, etc.), the deflection angle will be relatively small, and it is difficult to identify the materials according to the reconstructed scattering density. Due to the limited flux of natural cosmic rays, in scenes such as safety inspections that require a rapid detection, the material scattering density values reconstructed in a short period of time always have a large statistical fluctuation. Especially for low and medium atomic number materials, since the scattering density values of these materials are close to each other, it is more difficult to identify substances directly via scattering density values in view of the influence of statistical fluctuations.

The present disclosure addresses a requirement for identifying substances via the cosmic ray imaging. According to the interaction of cosmic rays and substances, a substance identification method and device based on cluster analysis to extract statistical feature are proposed. The method can realize the classification of low atomic number materials in cosmic rays in a short measurement time, and provides a rapid identification method for cosmic rays imaging to quickly distinguish prohibited substances.

SUMMARY

The purpose of the present disclosure is to provide an apparatus and a method for a fast substance identification.

According to a first aspect of the disclosure, there is provided a substance identification device comprising: a classifier establishing unit configured to establish a classifier based on scattering density values reconstructed for a plurality of known sample materials, wherein the classifier comprises a plurality of feature regions corresponding to a plurality of characteristic parameters for the plurality of known sample materials, respectively; and an identification unit for a material to be tested, configured to match the characteristic parameter of the material to be tested with the plurality of feature regions by using the classifier, to determine a feature region corresponding to the characteristic parameter of the material to be tested from the plurality of feature regions, and to identify a type of the material to be tested based on the feature region corresponding to the characteristic parameter of the material to be tested.

In the first aspect, the classifier establishing unit may comprise a noise reduction processing module configured to perform a noise reduction process on the scattering density values reconstructed for each of the plurality of known sample materials.

In the first aspect, the classifier establishing unit may comprise a cluster analysis module configured to perform a cluster analysis on the scattering density values processed by the noise reduction process for each of the plurality of known sample materials, so as to obtain a distribution feature of the scattering density values for each of the plurality of known sample materials.

In the first aspect, the classifier establishing unit may comprise a feature extraction module configured to extract the characteristic parameters reflecting material features based on the distribution feature of the scattering density values for each of the plurality of known sample materials.

In the first aspect, the classifier establishing unit may comprise a classifier establishing module configured to establish the classifier comprising the plurality of feature regions based on the extracted characteristic parameters and types of the known sample materials, wherein the plurality of feature regions correspond to the types for the plurality of known sample materials, respectively.

In the first aspect, the identification unit for the material to be tested may comprise a feature extraction module for the material to be tested, configured to extract characteristic parameters of the material to be tested; and a matching module configured to match the extracted characteristic parameters of the material to be tested with the feature regions in the classifier, so as to determine a matched feature region where the characteristic parameters are located, thereby identifying the type of the material to be tested based on the matched feature region.

In the first aspect, the matching module is further configured to fed the extracted characteristic parameters of the material to be tested and the identified type of the material to be tested into the classifier establishing module; and the classifier establishing module is further configured to update the classifier based on the fed characteristic parameters and the type of the material to be tested.

According to a second aspect of the disclosure, there is provided a substance identification method, which may comprise steps of: establishing a classifier based on scattering density values reconstructed for a plurality of known sample materials, wherein the classifier comprises a plurality of feature regions corresponding to a plurality of characteristic parameters for the plurality of known sample materials, respectively; and matching the characteristic parameter of a material to be tested with the plurality of feature regions by using the classifier, determining a feature region corresponding to the characteristic parameter of the material to be tested from the plurality of feature regions, and identifying a type of the material to be tested based on the a feature region corresponding to the characteristic parameter of the material to be tested.

In the second aspect, wherein the establishing a classifier based on scattering density values reconstructed for a plurality of known sample materials may further comprise performing a noise reduction process on the scattering density values reconstructed for each of the plurality of known sample materials.

In the second aspect, wherein the establishing a classifier based on scattering density values reconstructed for a plurality of known sample materials may further comprise: performing a cluster analysis on the scattering density values processed by the noise reduction process for each of the plurality of known sample materials, so as to obtain a distribution feature of the scattering density values for each of the plurality of known sample materials.

In the second aspect, wherein the establishing a classifier based on scattering density values reconstructed for a plurality of known sample materials may further comprise: extracting the characteristic parameters reflecting material features based on the distribution feature of the scattering density values for each of the plurality of known sample materials.

In the second aspect, wherein the establishing a classifier based on scattering density values reconstructed for a plurality of known sample materials may further comprise: establishing the classifier comprising the plurality of feature regions based on the extracted characteristic parameters and the types of known sample materials, wherein the plurality of feature regions correspond to the types for the plurality of known sample materials, respectively.

In the second aspect, the method may further comprising: extracting characteristic parameters of the material to be tested; and the identifying a type of the material based on the feature region corresponding to the characteristic parameter of the material to be tested further comprising: matching the extracted characteristic parameters of the material to be tested with the feature regions in the classifier, so as to determine a matched feature region where the characteristic parameters are located, thereby identifying the type of the material to be tested based on the matched feature region.

In the second aspect, the method may further comprise: feeding the extracted characteristic parameters of the material to be tested and the identified type of the material to be tested into the classifier, and the classifier is updated based on the fed characteristic parameters and the type of the material to be tested.

According to a third aspect of the disclosure, there is provided a non-transitory computer readable medium having recorded thereon a computer program executable by a processor, the computer program comprising program code instructions for implementing the method of the second aspect.

According to a third aspect of the disclosure, there is provided an electronic device, comprising: at least one processor, and a memory, configured to store at least one computer program which is executable by the processor, wherein the processor is configured to, when executing the computer program, perform the method of the second aspect.

Based on the substance identification device and substance identification method of this disclosure, the bottleneck that only heavy atomic number materials may be identified according to the reconstructed scattering density distribution can be broken through, and it is possible to realize the identification of low atomic number materials in cosmic rays with a short measurement time.

BRIEF DESCRIPTION OF THE DRAWINGS

The above and other aspects, features and advantages of the exemplary embodiments of the present disclosure will become more apparent from the following description taken in conjunction with the accompanying drawings, in which.

DETAILED DESCRIPTION

The embodiments of the present disclosure are described in detail below, and examples of the embodiments are shown in the drawings. Throughout the drawings, the same or similar reference numerals indicate the same or similar elements or elements having the same or similar functions. The embodiments described below with reference to the drawings are exemplary and are intended to explain the present disclosure, and should not be construed as limiting the present disclosure.

Those skilled in the art can understand that unless otherwise defined, the singular forms "a", "an", "said" and "the" used herein may also comprise the plural forms. It should be further understood that the word "comprising" used in the specification of the present disclosure refers to the presence of the described features, integers, steps, operations, elements and/or components, but does not exclude the presence or addition of one or more other features, integers, steps, operations, elements, components, and/or their groups. It should be understood that when an element is referred to as being "connected" or "coupled" to another element, it can be connected or coupled to the other element directly or via intervening elements. In addition, "connected" or "coupled" as used herein may refer to be wirelessly connected or wirelessly coupled. The expression "and/or" as used herein comprises all or any of one or more associated listed items and a combination thereof.

Those skilled in the art can understand that unless otherwise defined, all terms (comprising technical and scientific terms) used herein have the same meaning as those generally understood by those skilled in the art to which this disclosure belongs. It should also be understood that terms such as those defined in a general dictionary should be understood to have a meaning consistent with the meaning in the context of the prior art, and should not be idealized or explained with an excessively formal meaning unless specifically defined.

For a purpose of illustration, this disclosure takes 7 kinds of materials, i.e. paper, water, heroin, Teflon, aluminum, iron, and lead, as the examples of materials to be tested. However, those skilled in the art should understand that the material to be tested is not limited to this. The technical concept of the present disclosure, which will be described below with reference to the embodiments, is applicable to any materials.

Figure 2:
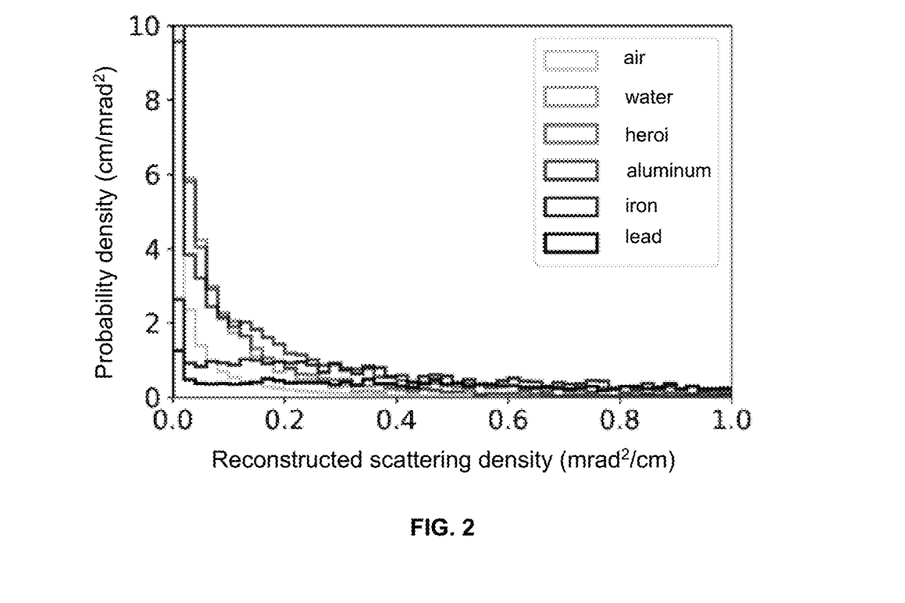
FIG. 2 shows a reconstructed scattering density distribution of different materials with a measurement time of 5 minutes.

In the disclosure, a method such as the Monte Carlo simulation method is used to simulate 5-minute detection results of a track array detection system in a case that the cosmic ray mussel passes through 7 kinds of materials: paper, water, heroin, Teflon, aluminum, iron, and lead, wherein the measurement area is divided into three-dimensional voxels with a size of 5 cm×5 cm×5 cm. An algorithm such as the PoCA algorithm is used to reconstruct the scattering density values of the measurement area. FIG. 2 shows a reconstructed scattering density distribution of respective material in an atmosphere environment with a measurement time of 5 minutes.

It can be easily seen from FIG. 2 that the scattering densities of all materials are mixed with each other, and the difference is that light materials have a higher probability of having a low scattering density. This means that it is very difficult to use the reconstruction results of a single voxel to perform substance identification. Due to this, the current existing technology only uses the muon scattering imaging technology to distinguish heavy atomic number materials such as aluminum, iron, lead, etc., and the classification for the materials with smaller atomic numbers (for example, paper, water, heroin, Teflon, etc.) has not been involved.

In addition, the scattering density can be calculated by using the variance of the substance scattering angle θ obtained after a plurality of measurements:

$$\hat{\lambda} = \frac{1}{N} \sum_{i=1}^{N} \theta_i^2 / x \qquad (3)$$

Assuming that the radiation length of the material to be tested is uniformly distributed, Bayesian theory can be used to calculate the posterior probability density distribution of the radiation length of the measured material $p(X_0/\rho|\lambda)$ when the scattering density value $\lambda$ is measured. For all possible measured scattering density values $\lambda$, the corresponding posterior probability density distribution $p(X_0/\rho|\lambda)$ is calculated. By using this posterior probability density distribution, for the actually measured scattering density value, a possible confidence interval of the radiation length of the measured material can be derived, so as to identify the substance. However, the identification effect for complex object scenes is not good.

In order to solve the above issue, there is provided a substance identification device and method for extracting statistical feature based on cluster analysis The concept of the device is to reconstruct the three-dimensional scattering density values; use a noise reduction algorithm to filter the initial three-dimensional scattering density values; perform a cluster analysis on the data in the statistical area; extract the characteristic parameters that can characterize the difference of the substance based on the analysis results; establish a material classifier based on the characteristic parameters; extract the characteristic parameters of the material to be tested and input them into the material classifier for matching; and identify the material based on the feature region where the characteristic parameters of the material to be tested are located.

Figure 3:
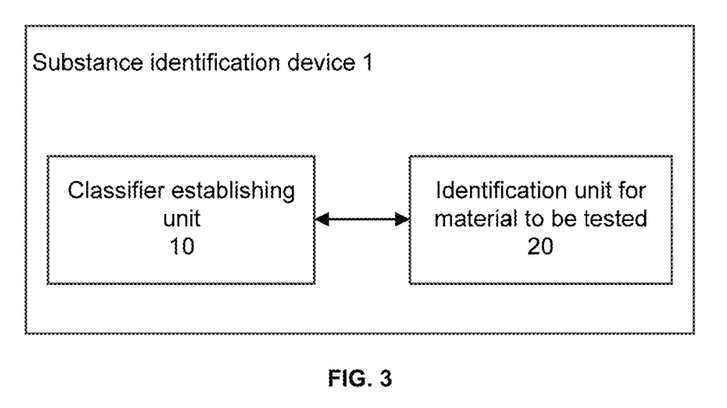
FIG. 3 shows a block diagram of a substance identification device according to the embodiment of the present disclosure.

For this technical concept, FIG. 3 shows a substance identification device 1 according to an embodiment of the present disclosure. As shown in the figure, the substance identification device 1 may comprise a classifier establishing unit 10 and an identification unit 20 for the material to be tested. The classifier establishing unit 10 may be electrically coupled to the identification unit 20 for the material to be tested, so as to transmit/receive the data.

The classifier establishing unit 10 may be configured to establish the classifier as described above.

The identification unit 20 may be configured to extract the characteristic parameters of the material to be tested, and input the extracted characteristic parameters into the classifier for matching.

Figure 4:
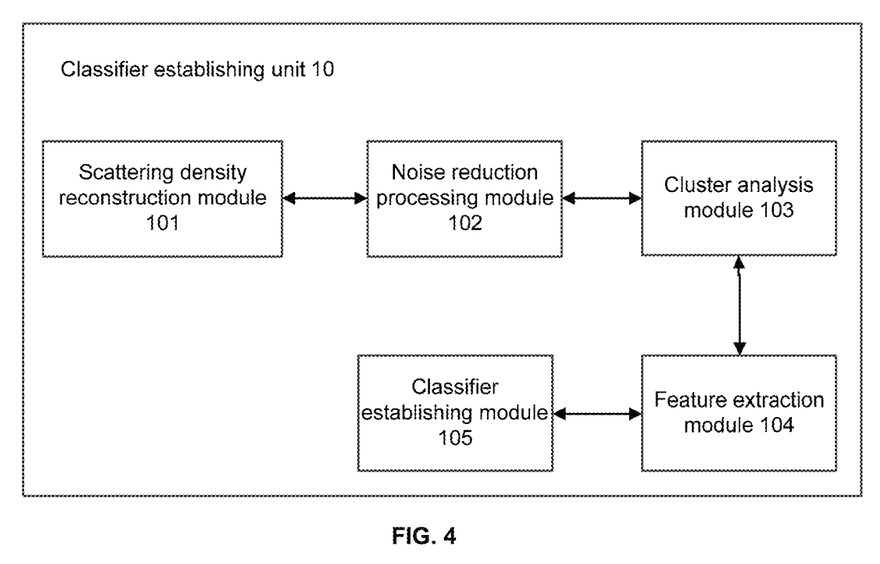
FIG. 4 shows a block diagram of a classifier establishing unit according to the embodiment of the present disclosure.

FIG. 4 shows a block diagram of a classifier establishing unit 10 according to the embodiment of the present disclosure.

In an exemplary embodiment, the classifier establishing unit 10 may comprise a scattering density reconstruction module 101, a noise reduction processing module 102, a cluster analysis module 103, a feature extraction module 104, and a classifier establishing module 105. In an exemplary embodiment, the scattering density reconstruction module 101, the noise reduction processing module 102, the cluster analysis module 103, the feature extraction module 104, and the classifier establishing module 105 may be electrically coupled with each other, so as to communicate, transmit and receive the data among these modules.

In an exemplary embodiment, the scattering density reconstruction module 101 may be configured to perform existing reconstructing operation for the scattering densities of the material to be test. In one example, the scattering density reconstruction method may comprise any one of various methods such as PoCA, MLSD and the like, or any combination thereof. However, those skilled in the art should understand that the scattering density reconstruction method may also be a scattering density reconstruction method developed in the future.

When reconstructing the scattering density, the measurement area is gridded by an appropriate size, and then divided into a plurality of three-dimensional voxels, each of which is used as the minimum unit for reconstructing the scattering density, wherein the appropriate size is determined according to the size of the detected object in the measurement scene. According to the measured muon track, the imaging algorithm is used to reconstruct the scattering density values of all voxels in the measurement area, so as to obtain a three-dimensional matrix composed of scattering densities. The imaging algorithms comprise but are not limited to PoCA, MLSD and the like.

In order to clarify and not obscure the disclosed concept of the present disclosure, the details of the process of reconstructing the scattering densities by the scattering density reconstruction module 101 using the scattering density reconstruction method are not redundantly repeated here.

Due to the large statistical fluctuations in the reconstructed scattering densities (for example, due to the large noise interference), it is difficult to directly identify the substance. Therefore, in order to reduce the noise interference and improve the accuracy for substance identification, a noise reduction algorithm is used to pre-process the initial scattering densities before the identification.

In an exemplary embodiment, the noise reduction processing module 102 may be configured to receive the reconstructed scattering densities from the scattering density reconstruction module 101 and perform a noise reduction process on the reconstructed scattering densities.

In one example, the noise reduction process may be implemented by using methods such as but not limited to mean filtering, nonlinear filtering, etc., and may also be implemented with any noise reduction processing method developed in the future.

Exemplarily, the noise reduction processing module 102 may be configured to perform the noise reduction process on the reconstructed scattering density of any voxel based on the reconstruction scattering densities of the neighboring voxels around the corresponding voxel.

In one example, when performing the noise reduction process, the scattering density of a certain voxel is processed by selecting the reconstruction results of the voxel and other voxels within a range of 3×3×3 around it. Exemplarily, a non-linear processing method based on support vector regression (SVR) is used for processing.

Figure 5:
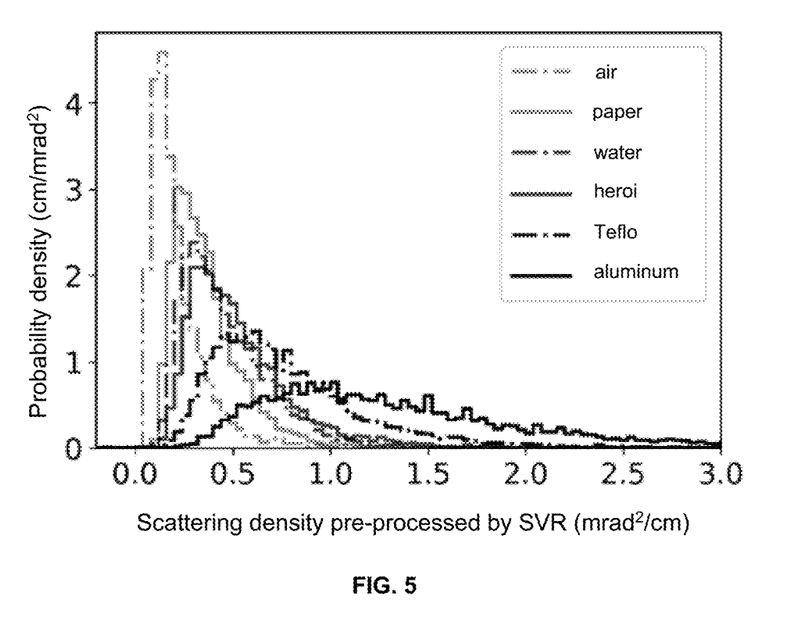
FIG. 5 shows a scattering density distribution for different materials after being preprocessed according to the embodiment of the present disclosure.

FIG. 5 shows a scattering density distribution for different materials after being preprocessed according to the embodiment of the present disclosure. It can be seen from the figure that although different materials still have large overlapping areas, they have a more obvious difference than the initial data (the reconstructed scattering densities in FIG. 2).

However, for short-term measurement results, even after being noise reduction processed, the scattering density of the same material is not a constant value, but has a certain continuous distribution. Moreover, the scattering densities of different materials overlap at a certain degree. There is still a substantial error in substance identifying based on the scattering density of a single voxel.

In order to identify the substance accurately, the scattering density values after the noise reduction process is further subjected to subsequent processing described in detail below.

The cluster analysis module 103 may be configured to receive the noise reduction processed scattering density values from the noise reduction processing module 102 and perform a cluster analysis on the noise reduction processed scattering density values.

Exemplarily, the cluster analysis module 103 may be configured to perform a cluster analysis on the scattering density values of spatially adjacent voxels, so as to obtain a distribution feature of the scattering density values.

In addition, the voxels are selected so that all the materials in the voxels can be assumed to be the same material.

The feature extraction module 104 may be configured to receive the cluster analysis result from the cluster analysis module 103 and extract characteristic parameters capable of characterizing the scattering density distribution based on the scattering density distribution feature.

In the example, the characteristic parameters can reflect the features of different materials.

In one example, the parameter extraction method may comprise but is not limited to curve fitting, parameter estimation, and the like.

Exemplarily, the Landau distribution fitting method will be used as an example for detailed description.

For the scattering density distribution in FIG. 5, by using the Landau distribution fitting method, it is found that the scattering density distribution of different materials is close to the Landau distribution, and can be approximately described by the following formula:

$$f(x, \mu, \sigma) = \frac{1}{\sqrt{2\pi}} \exp\left(-\frac{\left(\frac{x-\mu}{\sigma}\right) + e^{-\frac{x-\mu}{\sigma}}}{2}\right) \quad (4)$$

The distribution has two parameters: $\mu$ (a position parameter) and $\sigma$ (a scale parameter), wherein the position parameter $\mu$ is the horizontal coordinate of the highest point of the distribution, and the scale parameter $\sigma$ describes the spread of the distribution. These two parameters can uniquely determine the Landau distribution, which means that it can better reflect the features of the material and can be used as the characteristic parameters of the measurement results of different materials.

Figure 6:
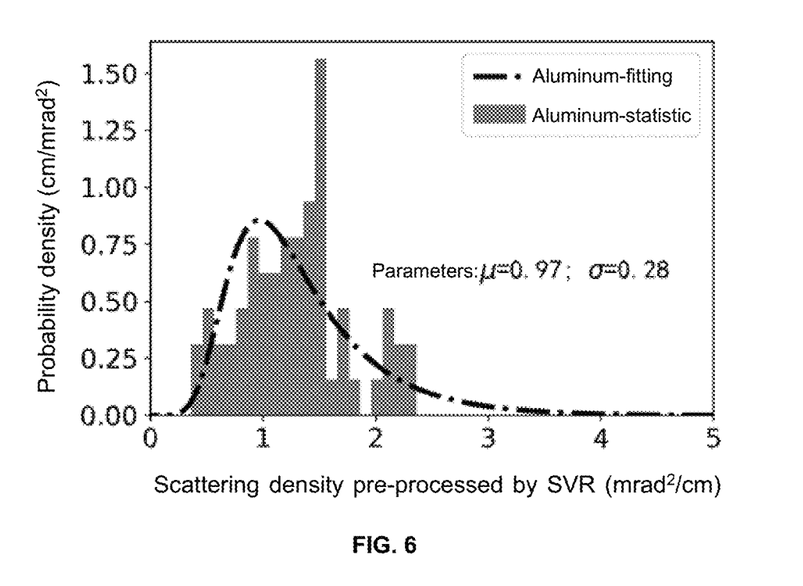
FIG. 6 shows a schematic diagram for characteristic parameter extraction according to the embodiment of the present disclosure.
Figure 7:
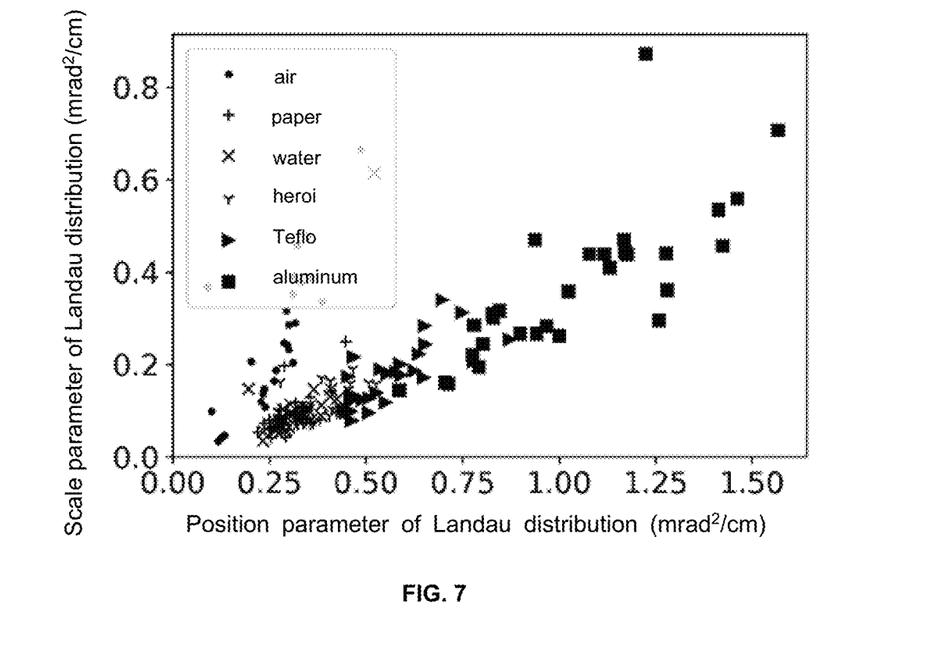
FIG. 7 shows a distribution for Landau characteristic parameters according to the embodiment of the present disclosure.

For security inspection scenarios such as security inspection on containers, since the involved objects are basically large scale substances, the statistical area can be divided by a volume of 20 cm×20 cm×20 cm, in which the material is considered to be the same. Then, the material in each area is divided into voxels. With respect to a material volume of 20 cm×20 cm×20 cm, if the voxel has a size of 5 cm×5 cm×5 cm, one material volume can be divided into 64 voxels. According to the scattering density value of 64 voxels in this area, the characteristic parameters in this area are extracted. In this embodiment, the position and scale parameters in the statistical area are extracted by means of maximum likelihood estimation. FIG. 6 shows a schematic diagram of the characteristic parameters extracted in the statistical area where the material of aluminum is located under the measurement time of 5 minutes. For a variety of different materials, the characteristic parameters in their located statistical area are analyzed statistically. As shown in FIG. 7, it can be seen that the characteristic parameters of different materials have different distributions.

As can be seen from FIG. 7, compared with the initial data shown in FIG. 2 (i.e., the reconstructed scattering density), it has been relatively easy to distinguish various materials in FIG. 7.

Based on the result obtained by the above processing, which is able to distinguish various materials easily, the present disclosure further establishes a classifier establishing module.

The classifier establishing module 105 may be configured to detect the material classifier by using a method such as a support vector machine, based on the characteristic parameters extracted by the feature extraction module 104.

By analyzing and processing the measurement results of different materials in an experiment or simulation way previously, the characteristic parameters of different materials can be extracted. Based on the extracted characteristic parameters and the type of material, the material classifier can be established by using the pattern recognition method, and used as the criterion of the substance identification. The pattern recognition methods comprise but are not limited to support vector machines, neural networks, etc.

Figure 8:
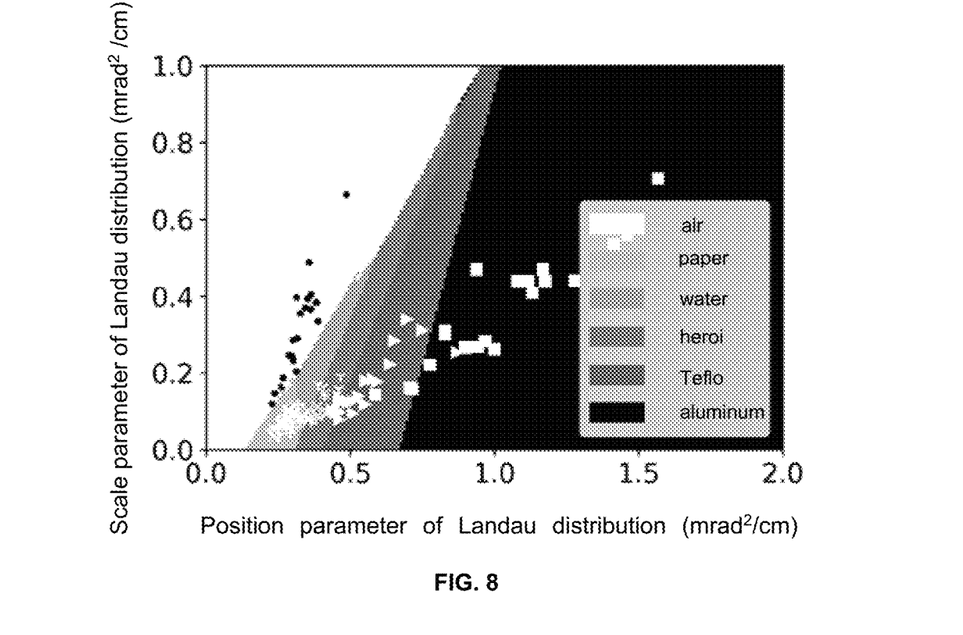
FIG. 8 shows a material classifier which is established based on analog data.
Figure 9:
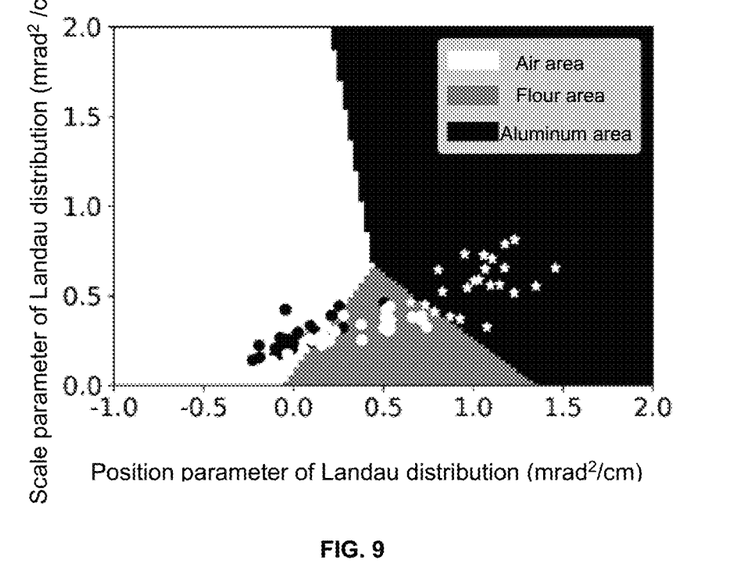
FIG. 9 shows a material classifier which is established based on experimental data.

FIG. 8 shows a material classifier based on analog data. FIG. 9 shows a material classifier which is established based on experimental data. The blocks of different colors represent the feature regions where different material characteristic parameters are located, that is, the result of the material classifier, wherein the plurality of feature regions correspond to the types for the plurality of known sample materials, respectively.

For a unknown materials, the characteristic parameters can be extracted by the above method and input into the material classifier to achieve substance identification. It is shown from the test of the simulation data that, under a measurement time of 5 minutes, an identification accuracy of 77% can be achieved for the simulated 7 materials and the air.

In the test, three different materials, i.e., a plastic box filled with flour, an aluminum block and a lead block, are measured by using a real cosmic ray muon track detection device. The experimental measurement results can be grouped into multiple groups of 5 min measurement results according to the flux of the cosmic ray muon, and perform the above processing on the measurement results as well. Finally, the classifier which are established for the air, the flour, the aluminum block and the lead block based on the experimental data are used for substance identification, as shown in FIG. 8. Based on the test of experimental data, under the effective measurement time of 5 minutes, the identification accuracy of the 4 materials is 91%.

Figure 10:
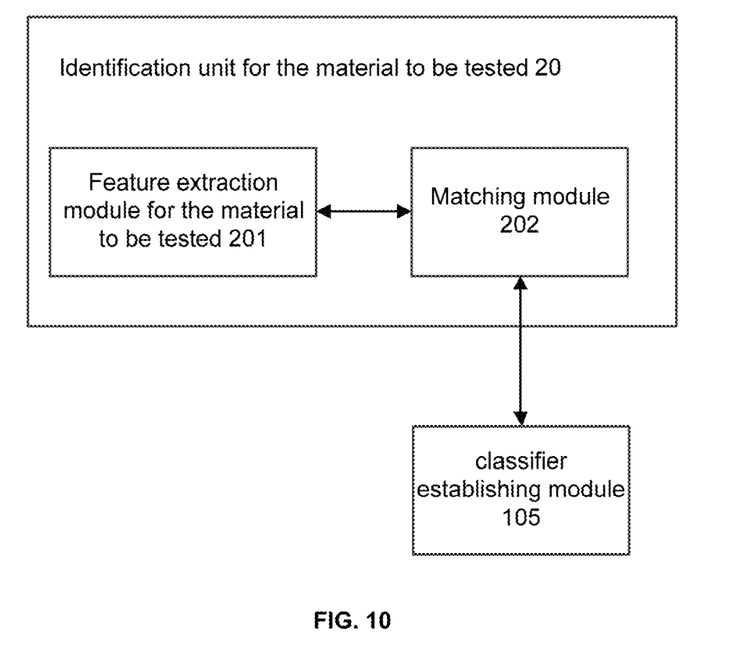
FIG. 10 shows a block diagram of an identification unit for a material to be tested according to the embodiment of the present disclosure.

FIG. 10 shows a block diagram of an identification unit for a material to be tested according to the embodiment of the present disclosure; The identification unit for the material to be tested 20 may comprise a feature extraction module for the material to be tested 201 and a matching module 202.

The feature extraction module for the material to be tested 201 may be configured to extract characteristic parameters of the material to be tested. Exemplarily, the step of extracting characteristic parameters performed by the feature extraction module for the material to be tested 201 may be the same as the operation performed by the feature extraction module 104. However, those skilled in the art should understand that any other means different from the means adopted by the feature extraction module 104 may be also adopted to extract the characteristic parameters.

The matching module 202 may be configured to receive the characteristic parameters for the material to be tested from the feature extraction module 201, and match the extracted characteristic parameters with the classifier established by the classifier establishing module 105, so as to determine the feature region of the classifier where the extracted characteristic parameters are located, thereby identifying the material to be tested, that is, determining the type of the material to be tested.

The matching module 202 can also be configured to communicate with the classifier establishing module 105, so as to transmit the characteristic parameters extracted for the material to be tested and the type of the material to be tested to the classifier establishing module 105, so that the classifier establishing module 105 may continuously update the classifier according to the extracted parameters of the material to be tested and the type of the material to be tested.

Figure 11:
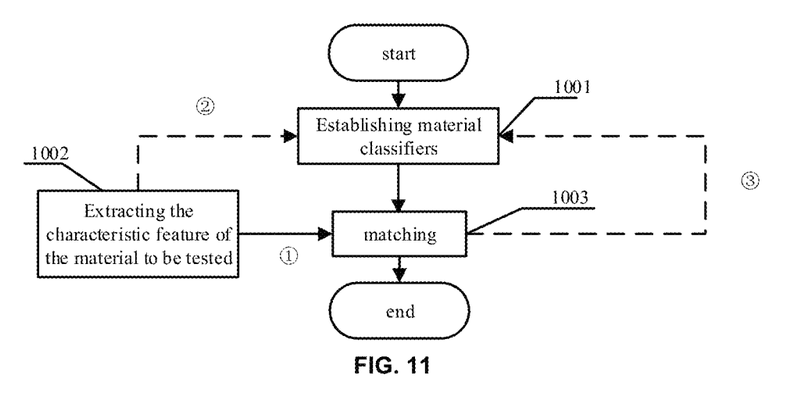
FIG. 11 shows a flowchart of a substance identification method according to the embodiment of the present disclosure.

Correspondingly, the disclosure also proposes a substance identification method performed by the above substance identification device. FIG. 11 shows a flowchart of the substance identification method according to the embodiment of the present disclosure; and At step 1001, firstly, a classifier for common materials is established based on a large amount of sample materials.

Exemplarily, the sample material may be any small atomic number material and heavy atomic number material such as paper, water, flour, aluminum, iron, and lead.

At step 1002, the characteristic parameters of the material to be tested are extracted.

After extracting the characteristic parameters of the material to be tested, at step 1003, the extracted characteristic parameters of the material to be tested can be matched with the material classifier established in step 1001 (operation ①), so as to determine the feature region of the classifier where the extracted characteristic parameter of the material to be tested is located, thereby identifying the material to be tested.

Additionally and exemplarily, the extracted characteristic parameters of the material to be tested and the matching result obtained in step 1003 (i.e., the type of the material to be tested) can also be fed into the material classifier established in step 1001 (operation ② and operation ③), so that in step 1001, the material classifier is further updated based on the fed characteristic parameters and the type of material.

Figure 12:
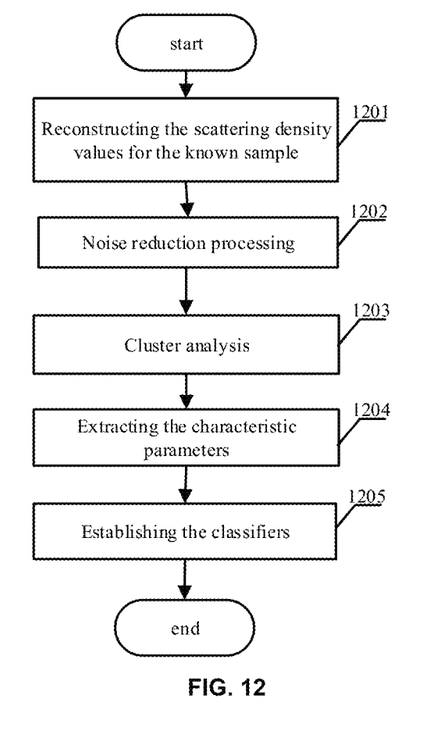
FIG. 12 shows an example flowchart of a process for establishing a material classifier according to the embodiment of the present disclosure.

FIG. 12 shows an example flowchart of a process for establishing a material classifier according to the embodiment of the present disclosure.

In step 1201, the scattering density values for the known sample are firstly reconstructed.

In step 1202, a noise reduction process is performed on the scattering density values reconstructed in step 1201 to filter the noise out. Exemplarily, the noise reduction process is performed based on the reconstruction results of surrounding neighboring voxels.

In step 1203, the noise reduction processed scattering density values of the spatially adjacent voxels are selected for cluster analysis.

In step 1204, by performing statistical analysis on the scattering density distribution of the voxels, according to the features of the distribution, characteristic parameters capable of characterizing the scattering density distribution are extracted therefrom. These parameters reflect the features of different materials.

In step 1205, a material classifier is established based on the extracted characteristic parameters and the type of material.

Alternatively, as described above, the material classifier may be updated in real time when it is used to identify the material to be tested later.

Although the various steps have been described above according to the order shown in the drawings, those skilled in the art should understand that the various steps may be performed in a different order, or the embodiments of the present disclosure may be performed without one or more of the above steps.

Figure 13:
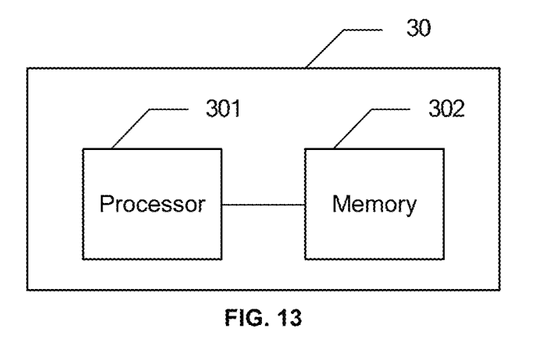
FIG. 13 shows an example flowchart of an electronic device according to the embodiment of the present disclosure.

FIG. 13 shows an example flowchart of an electronic device according to the embodiment of the present disclosure.

As can be seen from FIG. 13, the electronic device 30 may comprising: at least one processor 301, and a memory 302. The memory 302 is configured to store at least one computer program, the computer program can be executed by the processor 301, wherein the processor 301 is configured to, when executing the computer program, perform the substance identification method according to the above embodiments of the present disclosure.

It can be understood from the foregoing that the electronic components of one or more systems or devices may comprise, but are not limited to, at least one processing unit, a memory, and a communication bus or communication device that may couple various components comprising the memory to the processing unit. The system or device may comprise or have access to various device-readable media. A system memory may comprise device-readable storage media in the form of volatile and/or non-volatile memory (eg, read only memory (ROM) and/or random access memory (RAM)). By way of example and not limitation, the system memory may also comprise an operating system, application programs, other program modules, and program data.

Embodiments can be implemented as a system, method, or program product. Therefore, the embodiments may take the form of an all-hardware embodiment or an embodiment comprising software (comprising firmware, resident software, microcode, etc.), which may be collectively referred to as "circuit", "module", or "system" herein. In addition, embodiments may take the form of a program product embodied in at least one device-readable medium having device-readable program code stored thereon.

A combination of device-readable storage media can be used. In the context of the specification, a device-readable storage medium ("storage medium") may be any tangible non-signal medium, which may contain or store a program composed of program codes configured to be used by or in conjunction with an instruction execution system, apparatus, or device. For the purposes of this disclosure, the storage media or devices should be interpreted as non-transitory, that is, excluding signals or propagation media.

The present disclosure is presented for purposes of illustration and description, but is not intended to be exhaustive or limiting. Many modifications and changes will be apparent to those skilled in the art. The embodiments are selected and described in order to illustrate the principles and practical applications, and to enable those skilled in the art to understand various embodiments of the present disclosure with various modifications suitable for the expected specific uses.

We claim:

1. A substance identification device, comprising:
    a classifier establishing unit configured to establish a classifier based on scattering density values reconstructed for cosmic ray scattering by a plurality of known sample materials, wherein the classifier comprises a plurality of feature regions corresponding to a plurality of characteristic parameters for the plurality of known sample materials, respectively; and
    an identification unit for a material to be tested, configured to match the characteristic parameter of the material to be tested with the plurality of feature regions by using the classifier, to determine a feature region corresponding to the characteristic parameter of the material to be tested from the plurality of feature regions, and to identify a type of the material to be tested based on the feature region corresponding to the characteristic parameter of the material to be tested;

wherein the classifier establishing unit comprises:
a noise reduction processing module configured to perform a noise reduction process on the scattering density values reconstructed for each of the plurality of known sample materials; and
a cluster analysis module configured to perform a cluster analysis on the scattering density values processed by the noise reduction process for each of the plurality of known sample materials, so as to obtain a distribution feature of the scattering density values for each of the plurality of known sample materials.

2. The substance identification device of claim 1, wherein the classifier establishing unit further comprises:
a feature extraction module configured to extract the characteristic parameters reflecting material features based on the distribution feature of the scattering density values for each of the plurality of known sample materials.

3. The substance identification device of claim 2, wherein the classifier establishing unit further comprises:
a classifier establishing module configured to establish the classifier comprising the plurality of feature regions based on the characteristic parameters and the types for the plurality of known sample materials, wherein the plurality of feature regions correspond to the types for the plurality of known sample materials, respectively.

4. The substance identification device of claim 3, wherein the identification unit for the material to be tested comprises:
a feature extraction module for the material to be tested, configured to extract the characteristic parameters of the material to be tested; and
a matching module configured to match the extracted characteristic parameters of the material to be tested with the feature regions in the classifier, so as to determine a matched feature region where the characteristic parameters are located, thereby identifying the type of the material to be tested based on the matched feature region.

5. The substance identification device of claim 4, wherein the matching module is further configured to feed the extracted characteristic parameters of the material to be tested and the identified type of the material to be tested into the classifier establishing module; and
the classifier establishing module is further configured to update the classifier based on the characteristic parameters of the material to be tested and the type of the material to be tested.

6. A substance identification method, comprising:
establishing a classifier based on scattering density values reconstructed for cosmic ray scattering by a plurality of known sample materials, wherein the classifier comprises a plurality of feature regions corresponding to a plurality of characteristic parameters for the plurality of known sample materials, respectively; and
matching the characteristic parameter of a material to be tested with the plurality of feature regions by using the classifier, determining a feature region corresponding to the characteristic parameter of the material to be tested from the plurality of feature regions, and identifying a type of the material to be tested based on the feature region corresponding to the characteristic parameter of the material to be tested;

wherein the establishing a classifier based on scattering density values reconstructed for a plurality of known sample materials further comprising:
performing a noise reduction process on the scattering density values reconstructed for each of the plurality of known sample materials; and
performing a cluster analysis on the scattering density values processed by the noise reduction process for each of the plurality of known sample materials, so as to obtain a distribution feature of the scattering density values for each of the plurality of known sample materials.

7. The method of claim 6, wherein the establishing a classifier based on scattering density values reconstructed for a plurality of known sample materials further comprising:
extracting the characteristic parameters reflecting material features based on the distribution feature of the scattering density values for each of the plurality of known sample materials.

8. The method of claim 7, wherein the establishing a classifier based on scattering density values reconstructed for a plurality of known sample materials further comprising:
establishing the classifier comprising the plurality of feature regions based on the characteristic parameters and the types for the plurality of known sample materials, wherein the plurality of feature regions correspond to the types for the plurality of known sample materials, respectively.

9. The method of claim 8, further comprising: extracting the characteristic parameters of the material to be tested; and
the identifying a type of the material based on the feature region corresponding to the characteristic parameter of the material to be tested further comprising: matching the extracted characteristic parameters of the material to be tested with the feature regions in the classifier, so as to determine a matched feature region where the characteristic parameters are located, thereby identifying the type of the material to be tested based on the matched feature region.

10. The method of claim 9, further comprising:
feeding the extracted characteristic parameters of the material to be tested and the identified type of the material to be tested into the classifier, and the classifier is updated based on the characteristic parameters of the material to be tested and the type of the material to be tested.

11. A non-transitory computer readable medium having recorded thereon a computer program executable by a processor, the computer program comprising program code instructions for implementing the method of claim 6.

12. An electronic device, comprising:
at least one processor, and
a memory, configured to store at least one computer program which is executable by the processor,
wherein the processor is configured to, when executing the computer program, perform the method of claim 6.

* * * * *